United States Patent [19]

Whiffen

[11] Patent Number: 4,921,568

[45] Date of Patent: May 1, 1990

[54] MOVING HEAD HIGH FREQUENCY RESISTANCE WELDING SYSTEM

[75] Inventor: E. L. Whiffen, Fullerton, Calif.

[73] Assignee: Rockwell International Corporation, El Segundo, Calif.

[21] Appl. No.: 200,223

[22] Filed: May 31, 1988

[51] Int. Cl.⁵ ............................................. B32B 31/20
[52] U.S. Cl. .............................. 156/379.8; 156/380.6; 219/55; 219/83; 219/78.01
[58] Field of Search ............... 156/379.6, 379.7, 379.8, 156/379.9, 380.2, 380.3, 360, 350, 353, 274.4, 274.6, 574, 380.6, 380.8; 219/82, 83, 158, 55, 78.01, 78.16, 102, 159, 161, 124.1, 125.1; 901/42

[56] References Cited

U.S. PATENT DOCUMENTS

| | | | |
|---|---|---|---|
| 2,476,038 | 7/1949 | Golbert | 219/158 X |
| 3,377,460 | 4/1968 | Jonsson et al. | 219/125.1 |
| 3,410,982 | 11/1968 | Morris et al. | 219/78.16 X |
| 3,624,341 | 11/1971 | Hazelhurst | 219/158 X |
| 3,785,898 | 1/1974 | Gerber et al. | 156/353 |
| 3,946,933 | 3/1976 | Bergling | 219/124.31 X |
| 4,223,201 | 9/1980 | Peters et al. | 219/161 X |
| 4,232,209 | 11/1980 | Pedersen | 219/124.32 X |
| 4,285,752 | 8/1981 | Higgins | 156/350 X |
| 4,392,604 | 7/1983 | Sears | 219/125.1 X |

OTHER PUBLICATIONS

Welding Kaiser Aluminum, John W. Knight, Editor, pp. 12-1 through 12-9, Copyrighted 1967, (printed 1969).

Primary Examiner—Merrell C. Cashion, Jr.
Attorney, Agent, or Firm—Charles T. Silberberg; Harold C. Weston

[57] ABSTRACT

In a high frequency resistance welding system useable with massive or spatially extensive workpieces, the welding head is transported over weld areas by gantry means to provide high speed, high quality welds at appreciably less cost and with quality comparable to that of welds from conventional stationary head systems.

4 Claims, 2 Drawing Sheets

MOVING HEAD HIGH FREQUENCY RESISTANCE WELDING SYSTEM

This invention was made with Government support under F04701-87-C-0139 awarded by the United States Air Force. The Government has certain rights in the invention.

SUMMARY

High frequency resistance welding (HFRW) is a mature industrial process using flat metal stock to produce tubing, pipes, cans, finned tubing, structural shapes and many other widely used commercial materials. Machinery to achieve such manufactures generally consist of stock supply reels, shaping rollers, guide means and high capacity, high frequency, electrical power supplies with contact shoes to fuse the seams of such tubing or the interfaces of "T" sections and other structural shapes.

HFRW uses power supplies capable of providing a few thousand amperes of current at frequencies up to 500 kilo hertz to achieve its results. The high frequency current flows through the outer surface of the parts involved so that only the surface area is heated, minimizing expenditure of energy required for conventional low frequency operation where large volumes of the weld workpieces must be heated to near their melting temperature before coalescence is achieved.

HFRW lends itself readily to high volume production of commercial products. Flat stock is unspooled from supply reels and shaped into the end product requirement by mechanical guides and roller equipment until final form is achieved. At the very point of closure of the mechanically shaped product edges, electrical contacts on either side of the juncture provide high frequency current to the stock, heating the juncture edges to near their melting point temperature while pressure means force the edges together where they coalesce into each other, expelling foreign matter and contaminants as "flash" before solidifying as the temperature drops. Conventional methods for HFRW involve transporting the shaped raw stock through welding shoes of the head which is fixed solidly to mounting provisions of the factory. This invention provides a means for welding products too massive or areally extensive for fabrication in this conventional manner.

DESCRIPTION OF THE PREFERRED EMBODIMENT

Fuel and oxidizer tankage of modern space boosters consists of large monocoque cylinders designed for maximum volume and proper loads at minimum weight. Such cylinders consist of sculptured panels machined from flat plates of metal and formed to cylindrical conformity. The formed panels are welded together as necessary to form the cylinder. More efficient fabrication of the panel sections can be achieved by using HFRW to fuse T beam stringers to flat sheet. The method used to produce such reinforced panels by welding stringers to flat plate, or to ridges machined in flat plate is less costly than the alternative of machining off excess weight of thick flat stock, and is the subject of the within invention.

The HFRW head of this invention is capable of sequentially welding a set of structural support members (viz "stringers") to large flat panels of construction or assembly material. The application of principal concern is sequential welding of 50 to 60 foot T beam stringers to flat aluminum panels with widths of up to 15 feet and at stringer spacings of 6 to 12 inches.

Figure 1:
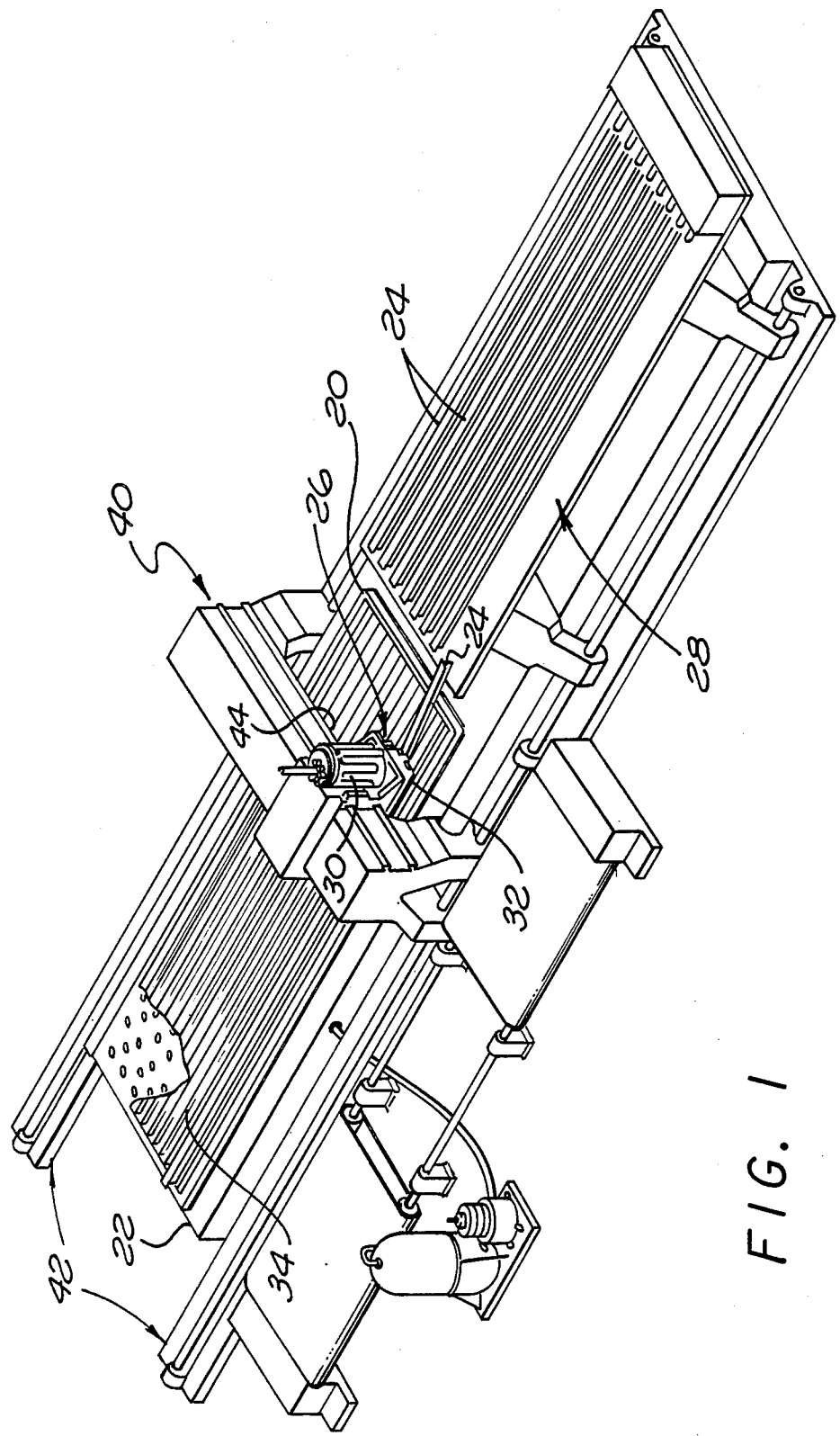
FIG. 1 is a plan view of a moving head high frequency resistance welding system.
Figure 2:
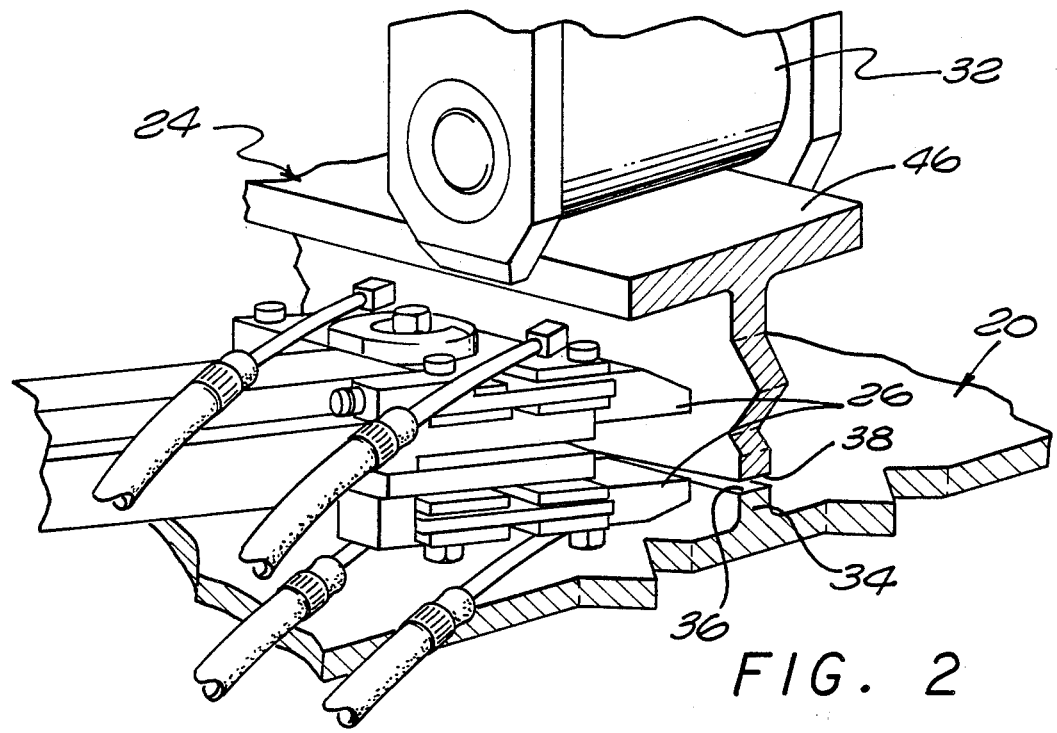
FIG. 2 is a perspective/sectional view of the stringer shaping means and welding shoes.
Figure 3:
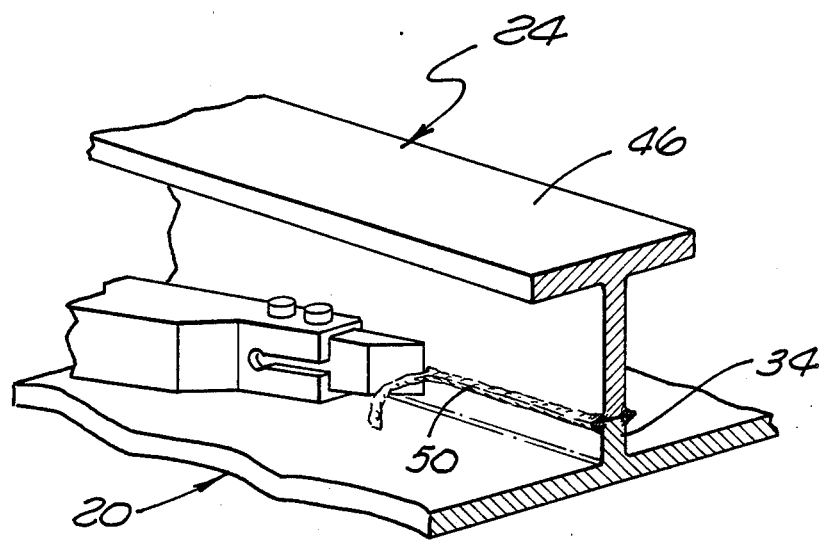
FIG. 3 shows a completed T-beam weld with "flashing" remover.

Workpiece panel 20 of FIG. 1 is held securely onto a fixed work table 22 by means of vacuum chucking through ports in the table surface. Vacuum maintained on the under surface secures workpiece 20 against movement as T beams 24 are welded on its opposite surface.

In all HFRW, surfaces to be welded are positioned at a small angle of between 4 and 7 degrees with respect to each other and welding shoes 26 are clamped against their workpieces at a position calculated to produce melting temperatures at the point of contact from current flowing between the shoes on surfaces of the workpieces. Heating of the surfaces is derived from normal $I^2R$ power generated by current flow.

Both depth of heating, i.e. the depth of the zone of melted material in the weld, and temperature of the surface melt material, is controlled by position of the welding shoes with respect to the weld point and by time of exposure of the surfaces to the heating current.

Conventional HFRW processes welded aluminum tubing from flat stock at rates greater than 1000 ft/minute with edges meeting at an angle of approximately 6 degrees and with shoes clamped about 1½ inches from the weld at a current of approximately 2,000 amperes.

For welding T beam stringers to large aluminum panels, T beams being configured from 0.070 to 0.10 inch 2219 T87 aluminum, and a welding current of up to 2000 amperes is anticipated, with the T beams supported at an angle between 4 and 7 degrees at the weld point.

In operation, weld head 30 is fixed solidly to the undercarriage of gantry 40. Gantry 40 extends completely over work table 22 to which work panel 20 is secured in a convenient manner. Vacuum ports on table 22 can be used to lock panel 20 to its upper surface.

Gantry 40 is mounted on rails or guideways 42 and is free to move the length of table 22 with appropriate margins for total coverage of panel 20. Movement of weld head 30 is controlled in incremental steps so that it is locked to discrete positions across undercarriage 44 of gantry 40. Each of these discrete positions corresponds to that position required for welding support structure (T beams) to panel 20.

T beams 24 are provided from magazines 28 at the terminal end of table 22. In operation, a workpiece T beam 24 is ejected from magazine 28 and held to panel 20 by shaping means 32. Shaping means 32 maintains T beam 24 surface 38 at an angle of approximately 6 degrees to panel surface 36 of ridge 34 on 20. Panel 20 may have seating ridges 34 machined therein, ridges 34 having an upper surface 36 seatable against lower surface 38 of T beam 24.

Shaping means 32 provides positive pressure to the top surface 46 of T beam 24 when current through welding shoes 26 has heated surface 38 of the T beam and 36 of ridge 34 to their melting temperature.

In operation, T beam section 24 is held against panel 20 by shaping means 32 while welding shoes 26 are clamped to T beam 24 and ridge 34. Shoes 26 are free to ride the surfaces of T beam 24 and ridge 34 and are maintained in good electrical contact with those surfaces as granty 40 and head 30 move along the beam for welding.

As surfaces 38 and 36 are melted by the HFRW current, shaping means 32 applies positive downward pressure on surface 46 of T beam 24 to cause T beam 24 and ridge 34 to coalesce into intimate contact. As head 30 moves down the length of the weld, heating current is removed and the weld zone rapidly drops in temperature, solidifying into solid contact. Flashing 50 can be removed by machining and polishing as required.

When welding head 30 has completed travel along a given T beam, control means in the gantry mechanism causes head 30 to move sideways on its gantry mounting to the position necessary for welding the next member. Welding shoes 26 are lifted from their contact points and head 30 is transported to the opposite end of table 22 and panel 20 while a new T beam is positioned on panel 20 by shaping means 32. Shoes 26 are clamped to T beam 24 and ridge 34 for a repeat of the welding process.

Indexing means used to reposition welding head 30 can be conventional detents or mechanical stops spaced as required by the structure panel. Numerical control positioning is standard in the automated welding industry and indexing of weld head 30 for operational runs can be achieved with state of the art equipments.

What is claimed is:

1. A high frequency resistance welding system for joining support stringers to a large structural panel, comprising:
    a panel support table;
    a stringer supply magazine;
    stringer shaping equipment;
    a high frequency resistance weld head;
    gantry means with a horizontal span greater than the width
    of said large structural panels;
    said gantry means being movable on fixed guide means with a range of travel greater than the length of said large panel;
    a high frequency resistance welding head with stringer shaping equipment coupled to a carriage movably mounted on the gantry means;
    said stringer shaping equipment comprising means for maintaining a stringer lower surface at an angle between 4 and 7 degrees to said large structural panel at an area of fusion near said welding head;
    said carriage being movable in increments in a direction transverse to said gantry guide means;
    said stringer supply magazine providing support stringers to the surface of said large panel through said stringer shaping equipment for welding to said panel as said gantry moves along its guide means; and
    means to move said welding head and stringer shaping equipment in incremental steps in a direction transverse to the direction of travel of said gantry on said guide means.

2. The system of claim 1 including vacuum attachment means to secure said large structural panel to said panel support table.

3. The system of claim 1 wherein said support stringers comprise T beams.

4. The system of claim 1 wherein said large structural panel has ridges machined therein along a length dimension and spaced apart from each other by a distance equal to said increment of movement of said carriage on said horizontal span.

* * * * *